(12) United States Patent
Burnett et al.

(10) Patent No.: US 8,384,651 B2
(45) Date of Patent: Feb. 26, 2013

(54) LAMP PROTECTION SYSTEM AND METHOD

(75) Inventors: Angela Renee Burnett, Indianapolis, IN (US); William Patrick McCarthy, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 2283 days.

(21) Appl. No.: 10/553,810

(22) PCT Filed: Feb. 5, 2004

(86) PCT No.: PCT/US2004/003320
§ 371 (c)(1),
(2), (4) Date: Oct. 18, 2005

(87) PCT Pub. No.: WO2004/097774
PCT Pub. Date: Nov. 11, 2004

(65) Prior Publication Data
US 2006/0279944 A1    Dec. 14, 2006

Related U.S. Application Data

(60) Provisional application No. 60/465,042, filed on Apr. 24, 2003.

(51) Int. Cl.
*G09G 3/36* (2006.01)
(52) U.S. Cl. ............... 345/102; 345/76; 345/84; 345/87
(58) Field of Classification Search ............ 345/55, 345/76, 84, 87, 102
See application file for complete search history.

(56) References Cited

U.S. PATENT DOCUMENTS

| | | | |
|---|---|---|---|
| 5,136,397 A | 8/1992 | Miyashita | |
| 6,388,388 B1 * | 5/2002 | Weindorf et al. | 315/169.3 |
| 6,588,907 B1 | 7/2003 | Billington et al. | |
| 6,704,061 B2 * | 3/2004 | Mears et al. | 348/730 |
| 2001/0013856 A1 | 8/2001 | Hamakada et al. | |
| 2002/0085127 A1 | 7/2002 | Mears et al. | |
| 2002/0186325 A1 | 12/2002 | Mears et al. | |

FOREIGN PATENT DOCUMENTS

WO    WO 02/071746    9/2002

OTHER PUBLICATIONS

European Search Report dated Mar. 20, 2006.
International Search Report.

* cited by examiner

*Primary Examiner* — My-Chau T Tran
(74) *Attorney, Agent, or Firm* — Robert D. Shedd; Robert B. Levy

(57) ABSTRACT

A video display system such as a liquid crystal display television receiver projection system typically uses a high-intensity discharge lamp of the type that should not be re-started or turned on immediately after being turned off. An improved system protecting the lamp from restarts during a cooling off period. The system maintains the lamp, once energized to produce an image, in an off condition during a predetermined cool-down period following receipt of a power-off. Advantageously, the system automatically powers the lamp on at the end of the cool-down period upon receipt a power-on command during the cool-down period.

9 Claims, 2 Drawing Sheets

LAMP PROTECTION SYSTEM AND METHOD

CROSS REFERENCE TO RELATED APPLICATIONS

This application claims the benefit, under 35 U.S.C. §365 of International Application PCT/US2004/03320, filed Feb. 5, 2004, which was published in accordance with PCT Article 21(2) on Nov. 11, 2004 in English and which claims the benefit of U.S. Provisional Patent Application No. 60/465,042 filed Apr. 24, 2003.

BACKGROUND

This invention relates to video display systems, methods of operating such systems to prevent damage to their high intensity discharge lamps during cool down periods, and to computer readable media comprising instructions for implementing the method and operating the system.

Liquid crystal micro displays (LCD) and liquid crystal on silicon (LCOS) television (TV) receiver projection systems often use a high-intensity discharge lamp, or bulb, as a light source. Typical high intensity discharge lamps operate with mercury vapor. It is known that preventing the mercury vapor from de-energizing before re-striking the vapor (i.e., turning power to the lamp back on immediately after or shortly after turning the power-off) can shorten the bulb life.

Because re-energizing a partially energized bulb should be avoided, some projection systems introduce a restart delay feature. Such a feature prevents the user from turning the TV receiver back on until the bulb is fully de-energized, which typically occurs after approximately 30 seconds. This approach is particularly annoying to the user because the user is not able to turn the TV receiver back on immediately, as is possible in a TV receiver that does not use such a high-intensity discharge lamp. Instead, the user must endure a start-up delay. The start-up delay includes approximately 30 seconds for the bulb to cool down and approximately another 30 seconds for the bulb to reheat.

In response to a user's command requesting system turn off, some systems display a message asking "Do you really want to turn off the system?" Such systems are useful for avoiding unintentional shutdowns, but do not solve the problem of intentional shutdowns followed shortly by intentional attempts to turn the system on.

Other prior systems give a false appearance of being turned off but maintain the bulb powered or energized during an interval of, for example, 30 seconds following a power-off command and if the user issues a power-on command before that interval has elapsed, the user does not experience any start-up delay and the television display resumes without having turned off the bulb.

Certain other prior art systems enforce the lamp cool down period by blinking the Power LED for a few seconds upon receipt of the Power-on command. However, the power-on command is then discarded. This results in frustration to the user because the user has no feedback on the precise duration of the cool down period and must resort to repeated attempts to power-on the television until at last it responds.

SUMMARY OF THE INVENTION

In one aspect, the present invention comprises a video display system comprising a lamp which is energized to produce an image, means for receiving a power-off command, means for maintaining the lamp in an off condition during a predetermined cool-down period following receipt of the power-off command, means for receiving a power-on command, and means for automatically powering on the lamp at the end of the predetermined cool-down period if a power-on command is received during the predetermined cool-down period.

In another aspect, the invention comprises an improved method of powering on a video display system having a lamp. The method commences with the step of maintaining the lamp in an off condition during a predetermined cool-down period following receipt of a power-off command and automatically powering on the lamp at the end of the cool-down period if a power-on command was received during the cool-down period.

A further aspect is a computer readable medium containing a program which when executed by a processor maintains a lamp in an off condition during a cool down period and automatically powers on the lamp following the cooling down period if a power-on signal is received during the cool-down period.

A preferred system, method, and program-containing computer readable medium provide a signal such as a blinking light emitting diode during the period following receipt of any power-on command during the cooling-down period. The user will observe the blinking light or other signal and understand that the system has received the user's power-on command but is not executing until the end of the cooling down period.

The invention is an improvement over prior systems that ignored power-on commands during the cool-down period or, worse, prematurely ended the cool-down period and powered the lamp on again.

DETAILED DESCRIPTION

Figure 1:
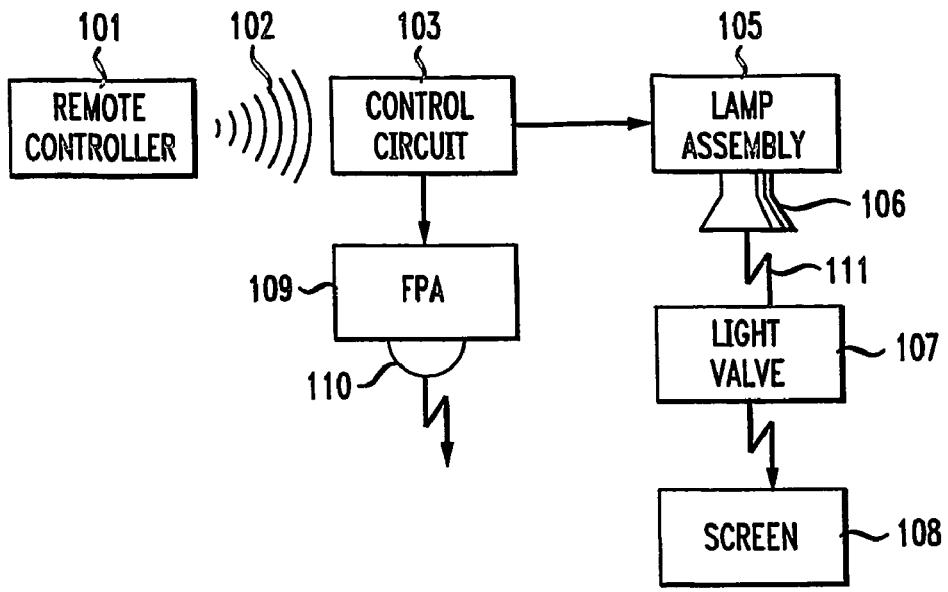
FIG. 1 illustrates a television system having a lamp, a receiver and processor for receiving power-on and power-off and for controlling the power-on and power-off operations.

FIG. 1 illustrates a video display system embodiment of the invention wherein a remote controller 101 sends infrared (IR) signals 102 upon actuation of one or keys by a user. A television apparatus having a control circuit 103 receives and processes the user-entered commands. Among its other functions the control circuit 103 controls the lamp assembly 105 by turning it on or off. The lamp assembly 105 has a projector 106 that illuminates 111 a screen 108 upon modulation by a light valve 107. The control circuit 103 also commands a front panel array (FPA) 109 to, among other functions, illuminate power-on indicator 110.

The video display system can include, for example, a liquid crystal display (LCD) or a liquid crystal on silicon (LCOS) projection television (TV) receiver. The lamp assembly 105 can be a high-intensity discharge lamp forming a light source for the light valve 107. The commands from remote controller 101 to the receiver can include discrete Power-On and Power-Off IR codes or can include a discrete Power-Toggle IR code. The user can send commands via the front panel display rather than the remote controller. The Power-On, Power-Off, or Power-Toggle commands can be sent by other means than a remote controller or front panel display.

Figure 2:
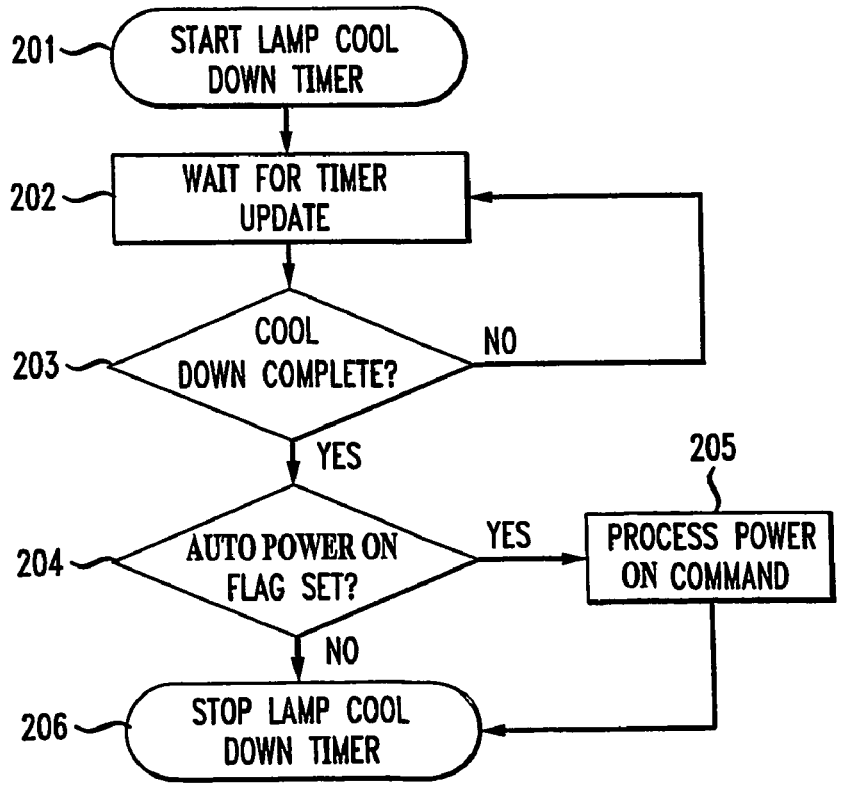
FIG. 2 illustrates flow chart for processing user-entered power-on and power-off commands.

FIG. 2 illustrates an embodiment of a flow chart illustrating a method, which comprises steps implemented by code in the control circuit 103 in the video system. The method commences upon execution of step 201 of FIG. 2 during which a lamp cool down timer starts counting, which typically occurs upon receipt of a power-off command from the remote controller 101 of FIG. 1 and powering off the lamp 106 of FIG. 1. The cool down timer is set to a predetermined length of time by the manufacturer, corresponding to the time needed for the lamp 106 to be fully de-energized. Step 202 occurs next, whereupon the control circuit 103 of FIG. 1 waits for a timer update. During step 203, a check occurs if lamp cool down is complete. If not, step 202 is re-executed. Upon finding that lamp cool-down completion has occurred during step 203, a check occurs during step 204 whether the auto power-on flag is set. The auto power-on flag becomes set upon receipt of a power-on command prior to the completion of the lamp cool down period according to the timer. If the flag is found set during step 204, then the power-on command is processed during 205 and then the lamp cool down timer is stopped during step 206. If the auto power-on flag was not set when a checked during step 204, i.e., if no power-on command was received during the cool down period, the processor stops the lamp cool-down timer during step 206 and awaits a power-on command.

Figure 3:
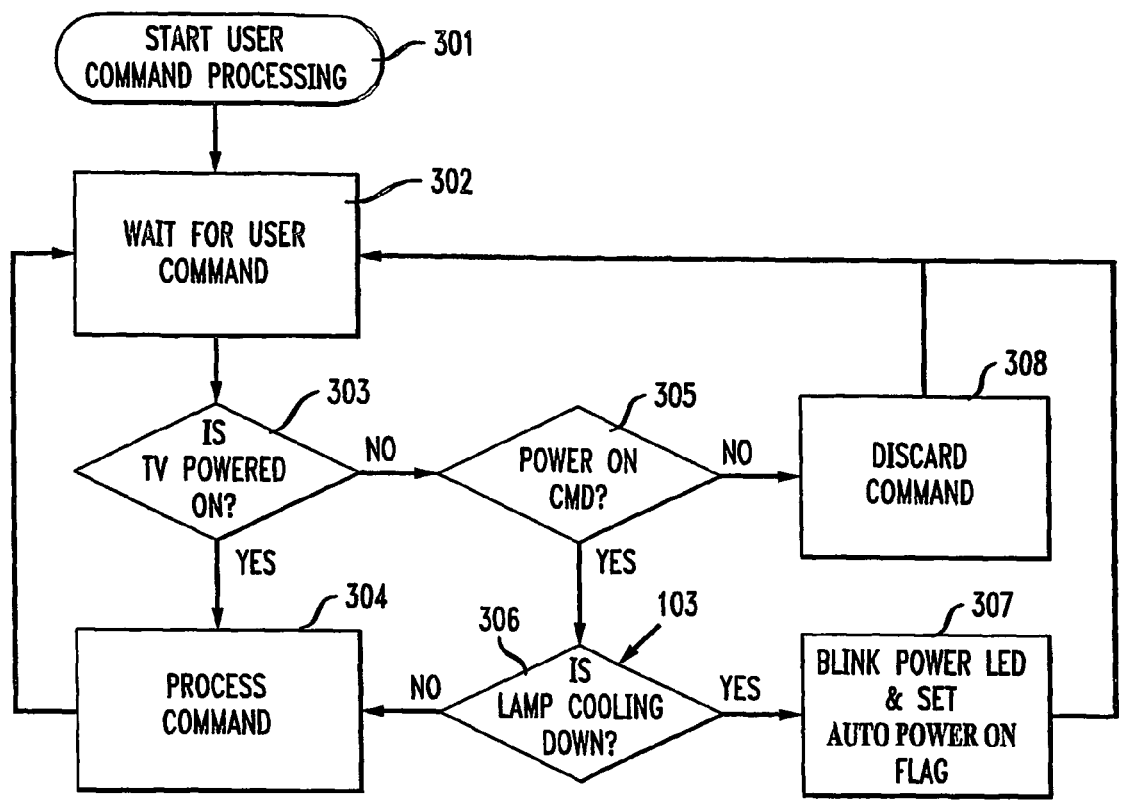
FIG. 3 illustrates a flow chart for processing user-entered power-off and power-on commands and for signaling receipt of a power-on command during a cool-down period.

FIG. 3 depicts an illustrative command processing flow chart embodiment wherein user command processing starts during step 301. During step 302, the system waits for a user command. During step 303, a check occurs whether the television is powered on. If so, commands are processed during step 304 before re-executing step 302 whereupon the system waits for the next command. If the television is powered off, a check occurs during step 305 whether a power-on command has been received. If a power-on command has been received, the system first checks if the lamp is still in the cool down period during step 306. Should the lamp still be in its cool-down period, the system blinks the power LED to signal the user that the power-on command was received and an auto power-on flag is set during step 307. If the lamp cooling down period is complete, step 304 occurs and the system processes the power-on command, whereupon the television becomes powered on. If the television is powered off during the check made in step 303, any commands received other than Power-On 305 are discarded during step 308.

When the deferred Power-On step 205 of FIG. 2 is processed, a lamp warm-up mode is entered (not shown) wherein the picture is first visible after approximately 10 seconds and then slowly becomes brighter.

The system, method, and programming according to the invention therefore provide protection for the lamp during the cool down period when power-on commands are received, but at the same time accepts power-on commands and holds them in abeyance until the end of the cool down period and then automatically executes them. In a preferred embodiment, the system acknowledges to the user receipt of a power-on command, which is being held in abeyance until the cool-down period has been completed according to the cool-down timer. The acknowledgement can be, for example, by blinking continuously blinking the power LED or blinking it according to a recognizable pattern.

What is claimed is:

1. A video display system comprising
   a lamp which is energized to produce an image,
   means for receiving a power-off command,
   means for maintaining the lamp in an off-condition during a predetermined cool-down period of time following receipt of the power-off command,
   means for receiving a power-on command during the predetermined cool-down period of time, and
   means for automatically powering on the lamp at the end of the predetermined cool-down period of time if the power-on command is received during the predetermined cool-down period of time.

2. The video display system of claim 1 having means for signaling receipt of a power-on command during the cool-down period of time.

3. The video display system of claim 1 having a power light emitting diode (LED) and means for blinking the power LED for the remainder of the cool-down period of time upon receipt of a power-on command during the cool-down period of time.

4. The video display system of claim 1 wherein the means for maintaining the lamp in an off condition during the cool-down period of time comprises a timer.

5. The video display system of claim 1 wherein the means for maintaining the lamp in an off condition during the cool-down period of time comprises a counter.

6. A method of powering on a video display system having a lamp energized to produce an image comprising the steps of
   (a) maintaining the lamp in an off condition during a predetermined cool-down period of time following receipt of a power-off command and
   (b) automatically powering on the lamp at the end of the cool-down period of time if a power-on command was received during the cool-down period of time.

7. The method of claim 6 further comprising the step of signaling receipt of a power-on command during the cool-down period of time.

8. The method of claim 6 further comprising the step of blinking an indicator for the remainder of the cool-down period of time following receipt of a power-on command during the cool-down period of time.

9. A computer readable medium encoded with a program which when executed by a processor maintains a lamp in an off condition during a cool down period of time and automatically powers on the lamp following the cooling down period of time if a power-on signal is received during the cool-down period of time.

* * * * *